United States Patent
Chung et al.

(10) Patent No.: US 8,824,857 B2
(45) Date of Patent: Sep. 2, 2014

(54) METHOD AND APPARATUS FOR THE VARIED SPEED REPRODUCTION OF VIDEO IMAGES

(75) Inventors: Hyun-Kwon Chung, Seoul (KR); Bong-Gil Bak, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/408,019

(22) Filed: Feb. 29, 2012

(65) Prior Publication Data

US 2012/0170909 A1    Jul. 5, 2012

Related U.S. Application Data (63) Continuation of application No. PCT/KR2010/005928, filed on Sep. 1, 2010.

(60) Provisional application No. 61/239,113, filed on Sep. 2, 2009.

(51) Int. Cl.
*H04N 5/783* (2006.01)
*H04N 9/80* (2006.01)
*H04N 5/92* (2006.01)

(52) U.S. Cl.
USPC ............................................. 386/248

(58) Field of Classification Search
USPC ................. 386/344, 343, E5.052, E9.011
See application file for complete search history.

(56) References Cited

U.S. PATENT DOCUMENTS

| | | | |
|---|---|---|---|
| 6,757,441 B1* | 6/2004 | Katayama et al. | 382/248 |
| 8,548,308 B2* | 10/2013 | Okubo et al. | 386/343 |
| 2005/0244148 A1 | 11/2005 | Tsumagari et al. | |
| 2006/0117357 A1* | 6/2006 | Surline | 725/90 |
| 2007/0257902 A1 | 11/2007 | Satoh et al. | |
| 2009/0074378 A1* | 3/2009 | Momosaki et al. | 386/76 |
| 2009/0202227 A1 | 8/2009 | Jang et al. | |
| 2010/0034510 A1* | 2/2010 | Oda et al. | 386/68 |
| 2010/0150523 A1* | 6/2010 | Okubo et al. | 386/68 |
| 2010/0178920 A1 | 7/2010 | Kitazoe et al. | |

FOREIGN PATENT DOCUMENTS

| | | |
|---|---|---|
| CN | 1247004 A | 3/2000 |
| CN | 1703915 A | 11/2005 |
| EP | 0 888 018 A1 | 12/1998 |
| JP | 2003-513564 A | 4/2003 |
| JP | 2005-110121 A | 4/2005 |
| JP | 2007-300371 A | 11/2007 |

(Continued)

OTHER PUBLICATIONS

U.S. Appl. No. 61/115,742, filed Nov. 2008, Okubo et al.*

(Continued)

*Primary Examiner* — Thai Tran
*Assistant Examiner* — Nien-Ru Yang
(74) *Attorney, Agent, or Firm* — NSIP Law (57) ABSTRACT

A method of reproducing a video image is provided. The method includes reproducing a video image in a three-dimensional (3D) manner, being requested to reproduce the video image at an Nx playback speed (N is a natural number equal to or greater than 2), and in response to the request, reproducing the video image at the Nx playback speed. The reproducing of the video image at the Nx playback speed comprises includes reproducing the video image at the Nx playback speed in a two-dimensional (2D) manner.

19 Claims, 4 Drawing Sheets

(56) References Cited

FOREIGN PATENT DOCUMENTS

| KR | 10-2001-0113748 A | 12/2001 |
|---|---|---|
| KR | 10-0348922 B1 | 11/2002 |
| KR | 10-2006-0042124 A | 5/2006 |
| KR | 10-2006-0047666 A | 5/2006 |
| KR | 10-2007-0098364 A | 10/2007 |
| RU | 2 237 283 C2 | 9/2004 |
| RU | 2009 116 628 | 11/2010 |
| WO | WO 2010/134003 A1 | 11/2010 |

OTHER PUBLICATIONS

Russian Office Action issued Dec. 4, 2012 in counterpart Russian Patent Application No. 201207859/07 (3 pages, in Russian).

International Search Report issued Apr. 29, 2011, in counterpart International Application No. PCT/KR2010/005928 (18 pages including English translation).

Australian Examination Report No. 1 issued Jun. 13, 2013 in counterpart Australian Application No. 2010290255 (3 pages, in English).

Russian Decision on Grant mailed Nov. 27, 2013 in counterpart Russian Application No. 2012107859 (14 pages, in Russian, with complete English translation).

Chinese Office Action mailed Mar. 7, 2014 in counterpart Chinese Application No. 201080039196.5 (17 pages, in Chinese, with complete English translation).

Japanese Office Action mailed Mar. 11, 2014 in counterpart Japanese Application No. 2012-527820 (4 pages, in Japanese, with complete English translation).

\* cited by examiner

| Syntax | NO. of bits | Mnemonic |
|---|---|---|
| STN_table_SS(){ | | |
| for(PlayItem_id=0; PlayItem_id<number_of_PlayItems;PlayItem_id++){ | | |
| length | 16 | uimsbf |
| Fixed_offset_during_PopUp | 1 | bslbf |
| *Fixed_offset_if_Faster_Than* | *7* | *uimsbf* |
| Reserved_for_future_use | 8 | bslbf |
| Additional data fields here... | | |
| } | | |
| } | | |

FIG. 6

METHOD AND APPARATUS FOR THE VARIED SPEED REPRODUCTION OF VIDEO IMAGES

CROSS-REFERENCE TO RELATED APPLICATION(S)

This application is a continuation application under 35 U.S.C. §§120 and 365(c) of PCT Application No. PCT/KR2010/005928 filed on Sep. 1, 2010, which claims the benefit under 35 U.S.C. §119(e) of U.S. Provisional Application No. 61/239,113 filed on Sep. 2, 2009, the entire disclosures of which are incorporated herein by reference for all purposes.

BACKGROUND

1. Field

The following description relates to a method and apparatus for the varied speed reproduction of video images.

2. Description of Related Art

A technology for reproducing a video image in a three-dimensional (3D) manner has been developed.

When a person sees a screen, an image projected on the screen is formed in each eye of the person. Since human eyes are separated from each other in a horizontal direction at a predetermined distance, two-dimensional (2D) images seen by the left eye and the right eye are different from each other. A distance between two points of the images formed in the eyes is called parallax.

The human brain combines the two 2D images, that are, the left-eye image and the right-eye image, to generate a 3D image that looks realistic.

The size of a binocular disparity affects a level of a cubic effect of a subject in the 3D image which is sensed by a user.

Figure 1:
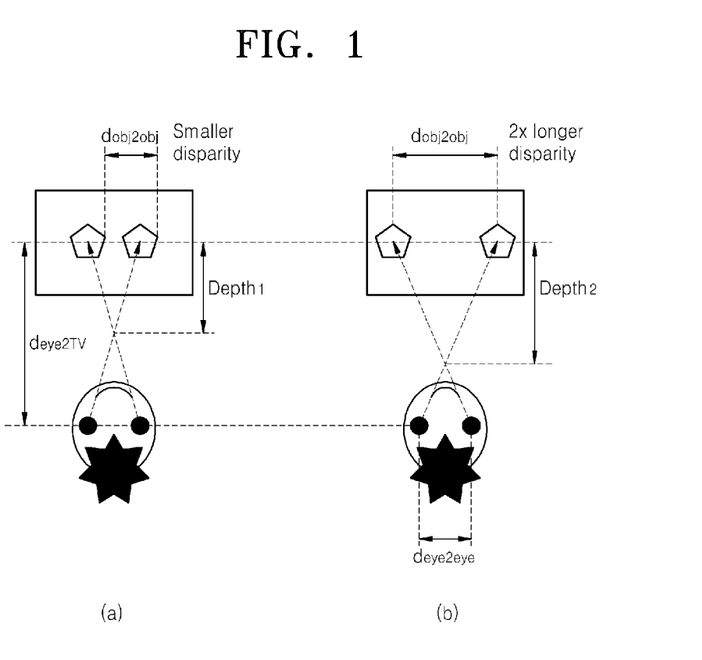
FIGS. 1A and 1B are views illustrating a difference in a cubic effect sensed by a user between subjects having different binocular disparities.

FIGS. 1A and 1B illustrate a difference in the cubic effect between subjects having different binocular disparities sensed by a user. A cubic effect Depth sensed by a user in FIG. 1A and FIG. 1B may be expressed as Equation 1.

$$\text{Depth} = d_{eye2TV} * d_{obj2obj} / (d_{obj2obj} + d_{eye2eye}) \quad (1)$$

where deye2TV relates to a distance between the user and a screen of a display device, dobj2obj relates to a horizontal distance between subjects in a left-eye image and a right-eye image, and deye2eye relates to a distance between the user's left eye and right eye.

In response to sizes of the subjects being the same, as shown in FIGS. 1A and 1B, and a ratio between binocular disparities in FIGS. 1A and 1B corresponding to 1:2, a ratio between the distances dobj2obj in FIGS. 1A and 1B corresponds to 1:2.

As shown in Equation 1, the cubic effect Depth sensed by the user may be proportional to a value obtained by multiplying the distance deye2TV between a TV and the eyes by the distance dobj2obj in an X-axis direction between the subjects in the left-eye image and the right-eye image displayed on the display device, and the cubic effect Depth is inversely proportional to a value obtained by the sum of the distance deye2eye and the distance dobj2obj.

In response to the distance deye2eye between the left and right eyes and the distance deye2TV between the user and the display device being fixed, a binocular disparity of each subject determines a level of a cubic effect sensed by the user.

In response to the assumption that the distance dobj2obj in FIG. 1A being 1, the distance dobj2obj in FIG. 1B being 2, and the distance deye2eye being 1, a binocular disparity sensed by the user in FIG. 1A corresponds to 0.5*deye2TV and a binocular disparity sensed by the user in FIG. 1B corresponds to 0.67*deye2TV.

In response to the user requesting to reproduce a video image at a playback speed, frames having different depth perceptions are reproduced at playback speeds different from a normal speed. In other words, the frames have different binocular disparities. In this case, since a change in a cubic effect between the frames is higher than a change in a cubic effect in response to a video image being reproduced at a normal speed, the user may feel dizzy when focusing on the subjects.

SUMMARY

According to an aspect, a method of reproducing a video image is provided. The method includes reproducing a video image in a three-dimensional (3D) manner, being requested to reproduce the video image at an Nx playback speed (N is a natural number equal to or greater than 2), and in response to the request, reproducing the video image at the Nx playback speed. The reproducing of the video image at the Nx playback speed includes reproducing the video image at the Nx playback speed in a two-dimensional (2D) manner.

The reproducing of the video image at the Nx playback speed may include, in response to the number N exceeding a reference playback speed value, reproducing the video image at the Nx playback speed in a 2D manner.

In response to the number N not exceeding the reference playback speed value, the method may include reproducing the video image at the Nx playback speed in a 3D manner.

A video stream and additional information about the video stream may be stored in a disc, and the additional information may include the reference playback speed value.

The additional information may be included in a stream number (STN) table stored in the disc.

The method may include extracting the reference playback speed value from a reproduction apparatus configured to perform the method.

The method may include receiving a reference playback speed value set by a user, and storing the reference playback speed value in the reproduction apparatus.

The reproducing of the video image in the 2D manner may include decoding a video stream to generate a left-eye image and a right-eye image, and outputting the left-eye image or the right-eye image.

The reproducing of the video image in the 2D manner may include decoding a video stream to generate a left-eye image or a right-eye image, and outputting the generated image.

During the reproducing of the video image at the Nx playback speed, a portion of frames of the video stream may be decoded.

The portion of frames decoded may be inversely proportional to the number N.

In another aspect, an apparatus for reproducing a video image is provided. The apparatus includes a user interface configured to request reproduction of a video image at an Nx playback speed (N is a natural number equal to or greater than 2), and a signal processing unit configured to reproduce a video image in a three-dimensional (3D) manner, and in response to being requested by a user to reproduce the video image at the Nx playback speed, reproduce the video image at the Nx playback speed in a two-dimensional (2D) manner.

In response to the number N exceeding a reference playback speed value, the signal processing unit may reproduce the video image at the Nx playback speed in a 2D manner.

In response to the number N not exceeding the reference playback speed value, the signal processing unit may reproduce the video image at the Nx playback speed in a 3D manner.

A video stream and additional information about the video stream may be stored in a disc, and the additional information may include the reference playback speed value.

The additional information may be included in a stream number (STN) table stored in the disc.

The reference playback speed value may be stored in the signal processing unit.

The user interface may receive from a user a reference playback speed value set by the user, and the signal processing unit may store the reference playback speed value.

The signal processing unit may include a decoding unit configured to decode a video stream to generate a left-eye image and a right-eye image, and an output unit configured to output the left-eye image or the right-eye image.

The signal processing unit may include a decoding unit configured to decode a video stream to generate a left-eye image or a right-eye image, and an output unit configured to output the generated image.

In another aspect, a computer-readable recording medium having embodied thereon a program for executing a method of reproducing a video image is provided. The method includes reproducing a video image in a three-dimensional (3D) manner, being requested to reproduce the video image at an Nx playback speed (N is a natural number equal to or greater than 2), and in response to the request, reproducing the video image at the Nx playback speed. The reproducing of the video image at the Nx playback speed includes reproducing the video image at the Nx playback speed in a two-dimensional (2D) manner.

In another aspect, a device for reproducing a video image is provided. The device includes an apparatus including a signal processing unit configured to reproduce a video image at an Nx playback speed (N is a natural number equal to or greater than 2) in a three-dimensional (3D) manner, and in response to reproducing the video image at the Nx playback speed, reproduce the video image at the Nx playback speed in a two-dimensional (2D) manner.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
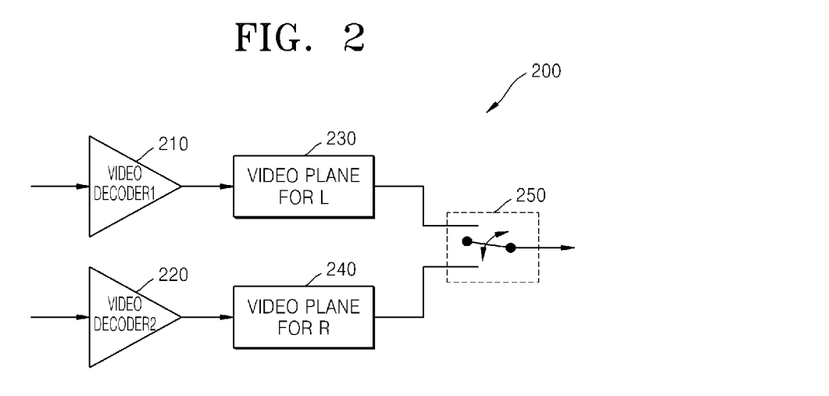
FIG. 2 is a diagram illustrating an example of an apparatus for reproducing a video image.

FIG. 2 illustrates an example of an apparatus 200 for reproducing a video image.

Referring to FIG. 2, the apparatus 200 includes a first video decoder 210, a second video decoder 220, a left-eye video plane buffer 230, a right-eye video plane buffer 240, and an output unit 250.

The apparatus 200 may further include a user interface unit (not shown) configured to be used for interaction between a user and the apparatus 200 and receive a control command from the user.

The apparatus 200 may read a video stream from a disc loaded into the apparatus 200 or download a video stream from an external server via a communication network. The apparatus 200 may decode the video stream and reproduce a video image in a two-dimensional (2D) manner or a three-dimensional (3D) manner.

In response to the video stream being a stereoscopic video stream for a 3D video image and a video image generated from the stereoscopic video stream being in a frame or field sequential format, the stereoscopic video stream may include a video stream for a reference view image and a video stream for an additional view image.

The first and second video decoders 210 and 220 included in the apparatus 200 of FIG. 2 may decode the video stream for the reference view image and the video stream for the additional view image, respectively.

For conciseness, the apparatus 200 is assumed to use the reference view image as a left-eye image and the additional view image as a right-eye image.

The first video decoder 210 may decode the video stream for the reference view image to generate the reference view image and store the reference view image as a left-eye image in the left-eye video plane buffer 230. The second video decoder 220 may decode the video stream for the additional view image to generate the additional view image and store the additional view image as a right-eye image in the right-eye video plane buffer 240.

The left-eye video plane buffer 230 and the right-eye video plane buffer 240 may temporarily store the left-eye image and the right-eye image, respectively.

The output unit 250 may sequentially output the left-eye image and the right-eye image stored in the left-eye video plane buffer 230 and the right-eye video plane buffer 240.

A user watching a video image may think that frames are sequentially reproduced without being disconnected in response to the frames being output at a frame rate of at least 60 Hz per eye. Accordingly, the frames may need to be output at a frame rate of at least 120 Hz and a left-eye image and a right-eye image may need to be combined, in order to generate a 3D image. The output unit 250 may sequentially output the left-eye image and the right-eye image every $1/120$ seconds to enable a video image to be reproduced in a 3D manner.

The user may request the apparatus 200 via the user interface to reproduce a video image at a playback speed. In response to the user requesting a trick play mode operation, the first video decoder 210 and the second video decoder 220 may decode some frames corresponding to a playback speed requested by the user. The trick play mode operation may be a fast forward operation or a fast rewind operation. The output unit 250 may alternately output the frames that are selectively decoded by the first video decoder 210 and the second video decoder 220 to enable a video image to be reproduced at the playback speed.

In response to a video image being reproduced at a playback speed, since only selected frames instead of all frames included in a video stream are decoded, a change in a depth perception between the selected frames may be increased drastically. The video image may be reproduced in a 3D manner.

In order to solve the problem of the drastic increase of depth perception, the apparatus 200 of FIG. 2 may enable a video image to be always reproduced in a 2D manner at a playback speed requested by a user.

In response to a user requesting the apparatus 200 to reproduce a video image at a playback speed, the apparatus 200 may always reproduce the video image in a 2D manner at the playback speed.

In another example, the apparatus 200 may reproduce a video image to be reproduced in a 2D manner or a 3D manner at a playback speed requested by a user.

As an aspect, in response to a user requesting the apparatus 200 to perform a fast forward operation or a fast rewind operation via the user interface, or in other words, in response to a user requesting the apparatus 200 to reproduce forward or backward a video image at an Nx playback speed (N is a natural number equal to or greater than 2), the apparatus 200 may determine whether the number N exceeds a reference playback speed value. In response to the number N exceeding the reference playback speed value, the apparatus 200 may reproduce the video image in a 2D manner, and in response to the number not exceeding the reference playback speed value, the apparatus 200 may reproduce the video image in a 3D manner.

In the present example, a reference playback speed value may refer to a speed value based on which a cubic effect of a video image is adjusted in response to the video image being reproduced at a playback speed.

The reference playback speed value may be stored as additional information in a disc in which a video stream is stored. In this case, the apparatus 200 may read the video stream and additional information about the video stream from the disc. Based on the reading of the additional information, the apparatus may determine whether the number N exceeds the reference playback speed value. The reference playback speed value may be included in the additional information.

In another example, the reference playback speed value may be stored in the apparatus 200. The reference playback speed value may be stored in, for example, a player setting register or a playback status register. The player setting register or the playback status register may be stored in the apparatus 200.

The reference playback speed value stored in the apparatus 200 may be set as a default value when a product comprising the apparatus 200 or the apparatus itself was manufactured, or the reference playback speed value may be changed by a user and stored in the apparatus.

In response to the playback speed requested by the user exceeding the reference playback speed value, the apparatus 200 may allow the first video decoder 210 or the second video decoder 220 to decode the video stream or may allow the output unit 250 to output only an image stored in the left-eye video plane buffer 230 or the right eye plane buffer 240 to enable a video image to be reproduced in a 2D manner at the playback speed.

As such, the apparatus 200 of FIG. 2 may reproduce a video image, which is reproduced in a 3D manner, in a 2D manner at a playback speed.

Figure 3:
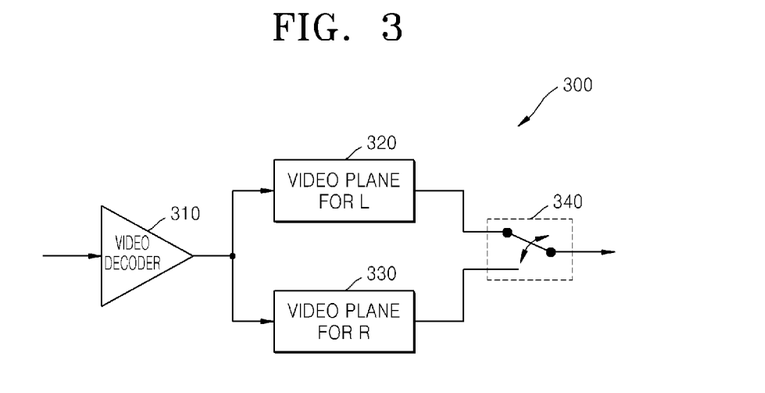
FIG. 3 is a diagram illustrating an example of an apparatus for reproducing a video image.

FIG. 3 illustrates an apparatus 300 for reproducing a video image.

Referring to FIG. 3, the apparatus 300 may include a video decoder 310, a left-eye video plane buffer 320, a right-eye video plane buffer 330, and an output unit 340.

The apparatus 300 may further include a user interface (not shown) for receiving a control command from a user.

The apparatus 300 of FIG. 3 is different from the apparatus 200 of FIG. 2 in that the apparatus 300 includes only one video decoder 310.

In response to a video image generated from a stereoscopic video stream being in a vertical or horizontal line interleaved format, a top-down format, or a side-by-side format in which information for generating a reference view image and information for generating an additional view image are combined and included in one frame, the video decoder 310 may use the information for generating the reference view image and the information for generating the additional view image included in the frame to generate the reference view image and the additional view image.

The video decoder 310 may decode the stereoscopic video stream to generate the reference view image and the additional view image, and store the reference view image and the additional view image as a left-eye image and a right-eye image in the left-eye video plane buffer 320 and the right-eye video plane buffer 330, respectively.

The left-eye video plane buffer 320 and the right-eye video plane buffer 330 may temporarily store the left-eye image and the right-eye image, respectively.

The output unit 340 may alternately output the left-eye image and the right-eye image stored in the left-eye video plane buffer 320 and the right-eye video plane buffer 330 to enable the video image to be reproduced in a 3D manner.

In response to a user requesting the apparatus 300 to reproduce forward or backward a video image at an Nx playback speed (N is a natural number equal to or greater than 2) via the user interface, the video decoder 310 may decode selected frames, instead of all frames, at intervals corresponding to the Nx playback speed requested by the user.

In response to a user requesting the apparatus 300 to reproduce a video image at an Nx playback speed, the apparatus 300 may always reproduce the video image in a 2D manner at the Nx playback speed, or may determine whether the number N exceeds a reference playback speed value and reproduce the video image in a 2D manner in response to the number N exceeding the reference playback speed value.

In the present example, in order to reproduce a video image in a 2D manner at an Nx playback speed, when decoding selected frames, the video decoder 310 may use only information for generating the reference view image or information for generating the additional view image and store the image in the left eye plane buffer 320 or the right-eye video plane buffer 330 to generate only a reference view image or an additional view image.

In this case, the output unit 340 may output the video image stored in the left-eye video plane buffer 320 or the right-eye video plane buffer 330 to enable a video image to be reproduced in a 2D manner.

In another example, the video decoder 310 may store a left-eye image and a right-eye image in the left-eye video plane buffer 320 and the right-eye video plane buffer 330, respectively, to enable a video image to be reproduced in a 2D manner and allow the output unit 340 to output only the image stored in the left-eye video plane buffer 320 or only the image stored in the right-eye video plane buffer 330.

Figure 4:
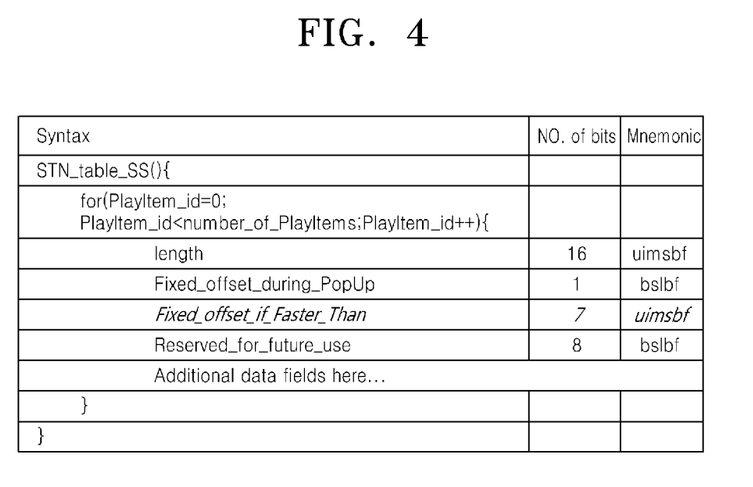
FIG. 4 illustrates an example of part of syntax of a stream number (STN) table in which a reference playback speed value is included.

FIG. 4 illustrates an example of part of the syntax of a stream number (STN) table in which a reference playback speed value is included.

When a disc (not shown) is loaded into the apparatus 200 or 300, the apparatus 200 or 300 may read a video stream from the disc and decode the video stream to reproduce a video image in a 3D manner.

An STN table in which additional information about the video stream is stored may also be stored in the disc. The STN table corresponds with a table showing clips designated by play items and information allowed to be reproduced along with the clips.

Since an author who generates the video stream and the additional information about the video stream and stores the video stream and the additional information in the disc knows a depth perception of a video image generated from the video stream, a method may be considered. The method may include in response to a request to reproduce a video image at a playback speed, allowing the author to determine a threshold value at which a 3D playback mode is forced to change to a 2D reproduction mode. Otherwise, the video image is reproduced in a 3D manner.

In response to a video image being reproduced at a playback speed, information about at what depth perception the video image is reproduced. In other words, a reference playback speed value set by a user may be included in the STN table of FIG. 4.

Referring to FIG. 4, the syntax of the STN table includes a field Fixed_offset_if_Faster_Than. While a stereoscopic video stream associated with the STN table is reproduced in a 3D manner, in response to a user's request to reproduce a video image at a playback speed and the playback speed requested by the user is equal to or greater than a 7-bit integer number defined in the field Fixed_offset_if_Faster_Than, the video image needs to be reproduced in a 2D manner instead of a 3D manner.

For example, in response to the 7-bit number defined in the field Fixed_offset_if_Faster_Than being 5 and the number N being 2, the apparatus 200 or 300 may reproduce the video image in a 3D manner at the 2× playback speed. In this case, in response to the number N being 6, the apparatus 200 or 300 may reproduce the video image in a 2D manner at the 6× playback speed.

As such, according to the examples described above, the apparatus 200 or 300 to may use a reference playback speed value stored in a STN table stored in a disc to determine whether a video image is to be reproduced in a 2D manner or a 3D manner in response to a user requesting the apparatus 200 or 300 to reproduce the video image at a playback speed.

FIGS. 5A through 5C illustrate an example of a change in a cubic effect of a reproduced video image.

FIGS. 5A through 5C illustrate a change in a cubic effect in response to a 3D video image being reproduced at a normal speed, at a 2× playback speed, and at a 6× playback speed, respectively.

A left graph of FIG. 5A illustrates a depth perception of each frame reproduced in a 3D manner along a time axis, and a right graph of FIG. 5A illustrates a playback sequence where only selected frames are used for a playback speed reproduction.

Figure 5:
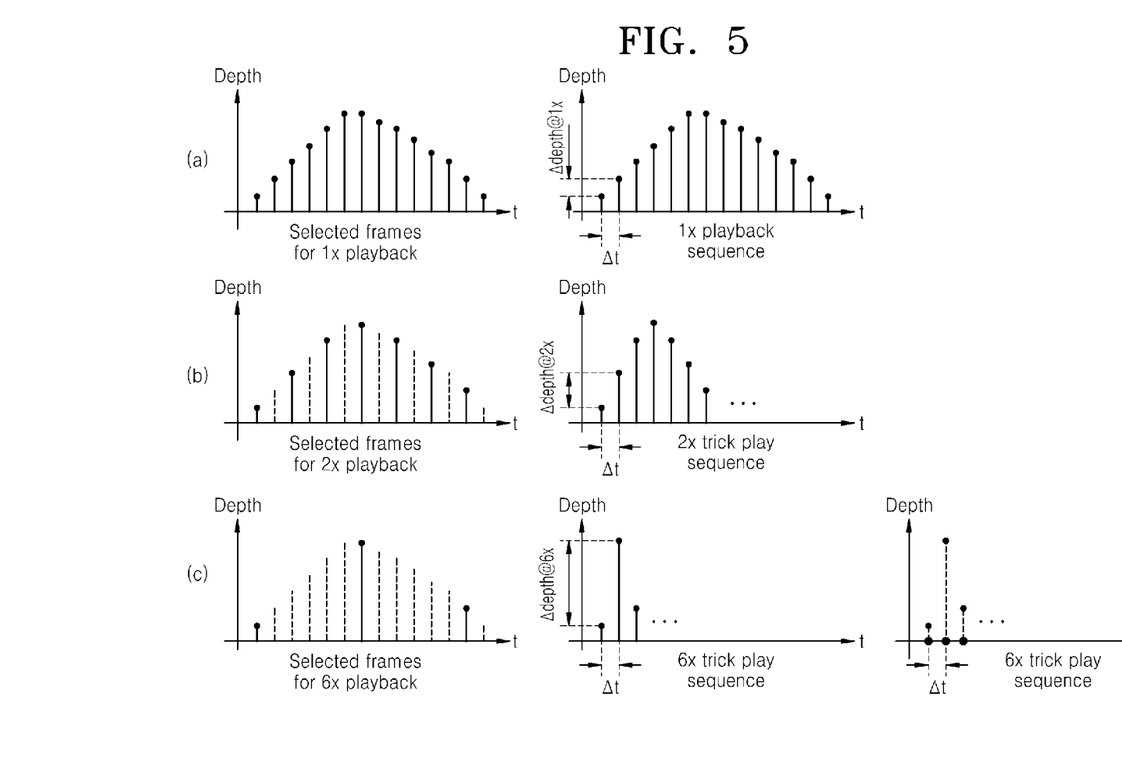
FIGS. 5A through 5C are graphs illustrating an example of a change in a cubic effect of a reproduced video image.

Since a video image is reproduced at a normal speed, for example, at a 1× speed, all frames illustrated in the left graph of FIG. 5 are selected and are shown to a user as in the right graph of FIG. 5A. In this case, a change in a cubic effect per unit time sensed by the user is a difference in a depth perception between a current frame and a previous frame, and may be expressed as $$\frac{\Delta \text{depth} @ 1X}{\Delta t}.$$

FIG. 5B illustrates a case where a 3D video image is reproduced at a 2× playback speed. A left graph of FIG. 5B shows a depth perception of each frame reproduced in a 3D manner along a time axis. In response to a user requesting the apparatus 200 or 300 to reproduce a video image at a 2× playback speed, the apparatus 200 or 300 selects only one of every two frames and decodes the selected frame. Selected frames for a 2× playback speed reproduction are indicated as a solid line in the left graph of FIG. 5B, and frames that are not selected are indicated as a dashed line in the left graph of FIG. 5B.

A right graph of FIG. 5B illustrates a playback sequence including only the selected frames of the left graph of FIG. 5B. In response to the frames illustrated in the right graph of FIG. 5B being sequentially reproduced, a change in a cubic effect per unit time sensed by the user may be expressed as $$\frac{\Delta \text{depth} @ 2X}{\Delta t}.$$

A change in a cubic effect per unit time sensed by a user in response to a video image being reproduced at a 2× playback speed is found to be higher by about two times than a change in a cubic effect per unit time sensed by a user in response to a video image being reproduced at a normal speed.

FIG. 5C illustrates a 3D video image being reproduced at a 6× playback speed. A left graph of FIG. 5C illustrates a depth perception of each frame reproduced in a 3D manner along a time axis. In response to a user requesting the apparatus 200 or 300 to reproduce a video image at a 6× playback speed, the apparatus 200 or 300 selects only one of every six frames and decodes the selected frame. Selected frames for a 6× playback speed reproduction are indicated by a solid line in the left graph of FIG. 5C and unselected frames are indicated by a dashed line in the left graph of FIG. 5C.

A middle graph of FIG. 5C illustrates a playback sequence including only the selected frames in the left graph of FIG. 5C. In response to the frames illustrated in the middle graph of FIG. 5C being sequentially reproduced, a change in a cubic effect per unit time sensed by the user may be expressed as $$\frac{\Delta \text{depth} @ 6X}{\Delta t}.$$

In this case, a change in a cubic effect sensed by a user when a video image is reproduced at a 6× playback speed is found to be much higher than a change in a cubic effect sensed by a user in response to a video image being reproduced at a normal speed or at a 2× playback speed.

The human brain may combine two different images seen by the left eye and right eye to recognize one object. In response to a change in a cubic effect between reproduced frames being too high, a disturbance occurs in response to the brain using a left-eye image and a right-eye image to recognize the object and the user feels dizzy and the user's eyes feel strained.

A right graph of FIG. 5C illustrates a playback sequence in response to depth perceptions of the selected frames in the left graph of FIG. 5C being adjusted.

In the present example, in response to a user requesting the apparatus 200 or 300 to reproduce a video image at a 6× playback speed, the apparatus 200 or 300 uses a reference playback speed value to determine whether the video image is to be reproduced in a 2D manner or a 3D manner. In FIG. 5C, in response to the reference playback speed value being equal to or less than, for example, 5, since the 6× playback speed requested by the user exceeds the reference playback speed value, the apparatus 200 or 300 reproduces the video image in a 2D manner at the 6× playback speed. In this case, the apparatus 200 or 300 reproduces frames in a 2D manner after depth perceptions are adjusted to predetermined values, as shown in the right graph of FIG. 5C.

Figure 6:
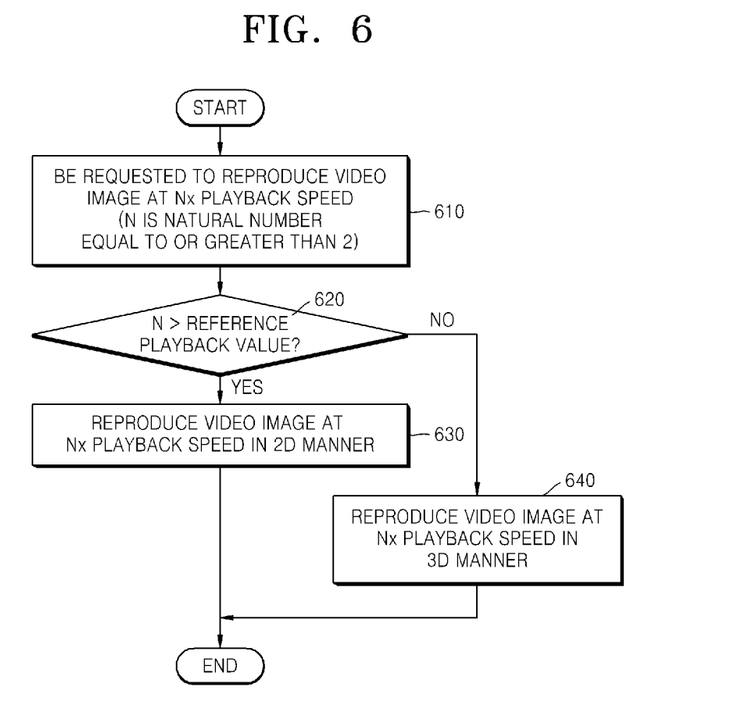
FIG. 6 is a flowchart illustrating an example of a method of reproducing a video image.

FIG. 6 illustrates an example of a method of reproducing a video image. The apparatus 200 or 300 may decode a video stream to reproduce a video image in a 3D manner.

In operation 610, the apparatus 200 or 300 via the user interface is requested from a user to reproduce a video image at an Nx playback speed (N is a natural number equal to or greater than 2).

In operation 620, the apparatus 200 or 300 determines whether the number N exceeds a reference playback speed value. The reference playback speed value may be included and stored in additional information stored in a disc along with a video stream, or the reference playback speed value may be stored in a memory in the apparatus 200 or 300. In another example, the reference playback speed value may be selected by the user.

The apparatus 200 or 300 extracts the reference playback speed value from the disc or the apparatus 200 or 300, or the apparatus 200 or 300 receives from the user a reference playback speed value set by the user, and compares the reference playback speed value with the number N.

If, in operation 620, the apparatus 200 or 300 determines that the number N exceeds the reference playback speed value, the method proceeds to operation 630. In operation 630, the apparatus 200 or 300 reproduces the video stream in a 2D manner at the Nx playback speed. In another aspect, in operation 620, in response to the apparatus 200 or 300 determining that the number N does not exceed the reference playback speed value, the method proceeds to operation 640. In operation 640, the video image is reproduced in a 3D manner at the Nx playback speed.

Examples of devices including the apparatus include a blu-ray player, a desktop computer, a laptop computer, and the like.

The present invention provides a method and apparatus for reproducing a video image, which is reproduced in a three-dimensional (3D) manner, at a playback speed by adjusting a cubic effect of the video image.

A video image which is reproduced in a three-dimensional (3D) manner may be reproduced at a playback speed in a two-dimensional (2D) manner.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing video data, the method comprising:
   processing left eye image data and right eye image data from the video data for providing a three-dimensional (3D) effect;
   receiving a request to reproduce the video data at an Nx playback speed where N is a natural number equal to or greater than 2; and
   in response to the received request to reproduce the video data at an Nx playback speed where N is a natural number equal to or greater than 2, reproducing one of the left eye image data and the right eye image data without reproducing the other one of the left eye image data and the right eye image data in a 2D manner.

2. The method of claim 1, wherein the reproducing of one of the left eye image data and the right eye image data includes, in response to the number N exceeding a reference playback speed value, reproducing one of the left eye image data and the right eye image data without reproducing the other one of the left eye image data and the right eye image data at the Nx playback speed in a 2D manner.

3. The method of claim 2, in response to the number N not exceeding the reference playback speed value, the method further comprising reproducing the video data at the Nx playback speed in a 3D manner.

4. The method of claim 2, wherein a video stream and additional information about the video stream are stored in a disc, and the additional information includes the reference playback speed value.

5. The method of claim 4, wherein the additional information is included in a stream number (STN) table stored in the disc.

6. The method of claim 2, further comprising extracting the reference playback speed value from a reproduction apparatus configured to perform the method.

7. The method of claim 6, further comprising:
receiving a reference playback speed value set by a user; and
storing the reference playback speed value in the reproduction apparatus.

8. The method of claim 2, wherein the reproducing of one of the left eye image data and the right eye image data comprises:
decoding a video stream to generate the left-eye image data and the right-eye image data; and
outputting the left-eye image data or the right-eye image data.

9. The method of claim 2, wherein the reproducing of one of the left eye image data and the right eye image data comprises:
decoding a video stream to generate the left-eye image data or the right-eye image data; and
outputting the generated image data.

10. An apparatus for processing video data, the apparatus comprising:
a user interface configured to receive a request for a reproduction of the video data at an Nx playback speed where N is a natural number equal to or greater than 2; and
a signal processing unit configured to process left eye image data and right eye image data from the video data for providing a three-dimensional (3D) effect, and in response to the received request for a reproduction of the video data at an Nx playback speed where N is a natural number equal to or greater than 2, reproduce one of the left eye image data and the right eye image data without reproducing the other one of the left eye image data and the right eye image data in a 2D manner.

11. The apparatus of claim 10, wherein in response to the number N exceeding a reference playback speed value, the signal processing unit reproduces one of the left eye image data and the right eye image data without reproducing the other one of the left eye image data and the right eye image data at the Nx playback speed.

12. The apparatus of claim 11, wherein in response to the number N not exceeding the reference playback speed value, the signal processing unit reproduces the video data at the Nx playback speed in a 3D manner.

13. The apparatus of claim 11, wherein a video stream and additional information about the video stream are stored in a disc, and the additional information includes the reference playback speed value.

14. The apparatus of claim 13, wherein the additional information is included in a stream number (STN) table stored in the disc.

15. The apparatus of claim 11, wherein the reference playback speed value is stored in the signal processing unit.

16. The apparatus of claim 15, wherein the user interface receives from a user a reference playback speed value set by the user, and
wherein the signal processing unit stores the reference playback speed value.

17. The apparatus of claim 11, wherein the signal processing unit comprises:
a decoding unit configured to decode a video stream to generate the left-eye image data and the right-eye image data; and
an output unit configured to output the left-eye image data or the right-eye image data.

18. The apparatus of claim 11, wherein the signal processing unit comprises:
a decoding unit configured to decode a video stream to generate the left-eye image data or the right-eye image data; and
an output unit configured to output the generated image data.

19. A non-transitory computer-readable recording medium having embodied thereon a program for executing a method of processing video image data, the method comprising:
processing left eye image data and right eye image data from the video data for providing a three-dimensional (3D) effect;
receiving a request to reproduce the video data at an Nx playback speed where N is a natural number equal to or greater than 2; and
in response to the received request to reproduce the video data at an Nx playback speed where N is a natural number equal to or greater than 2, reproducing one of the left eye image data and the right eye image data without reproducing the other one of the left eye image data and the right eye image data in a 2D manner.

* * * * *